April 7, 1942.　　　A. F. KNIGHT　　　2,278,997
SHAFT COUPLING
Filed Dec. 23, 1941　　　3 Sheets-Sheet 1
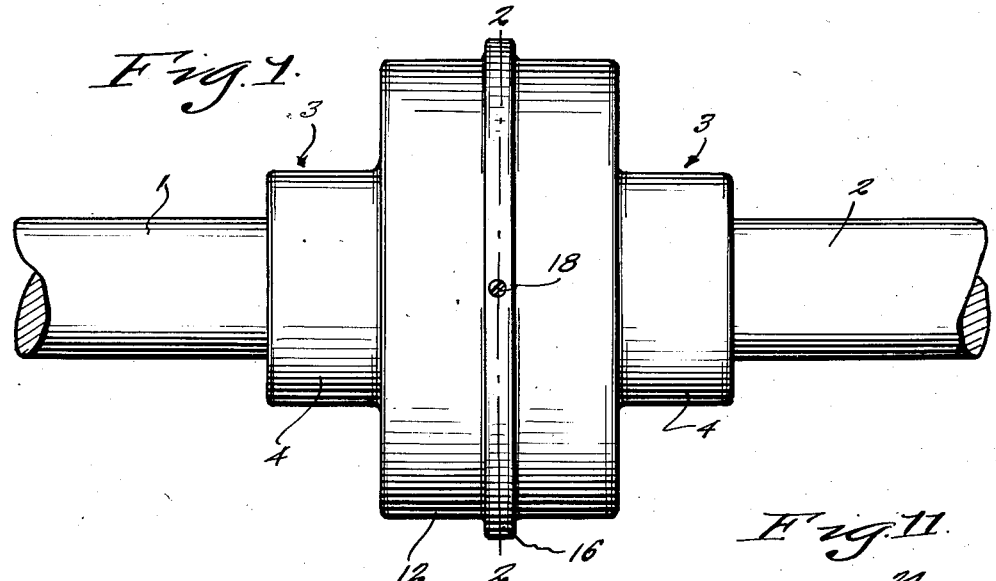
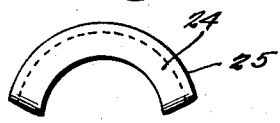
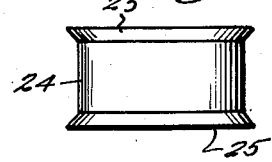
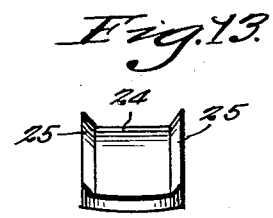
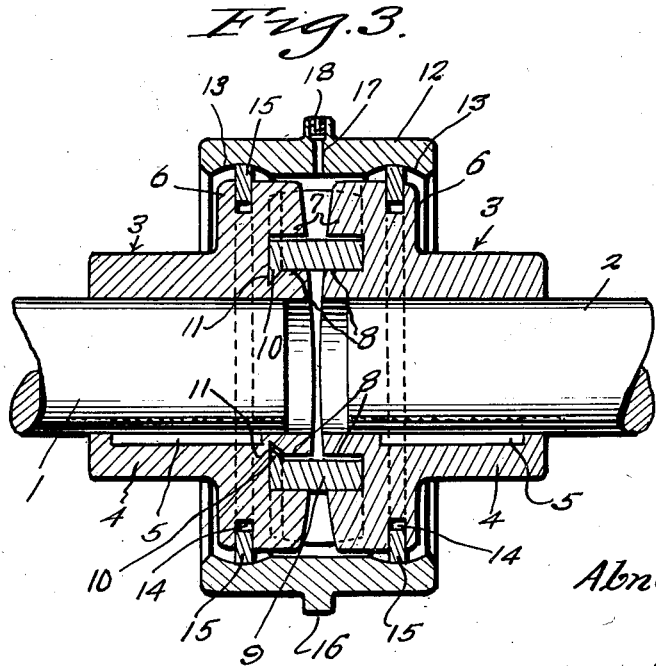
Inventor
Abner F. Knight
By Clarence A. O'Brien
Attorney April 7, 1942.  A. F. KNIGHT  2,278,997
SHAFT COUPLING
Filed Dec. 23, 1941   3 Sheets-Sheet 2
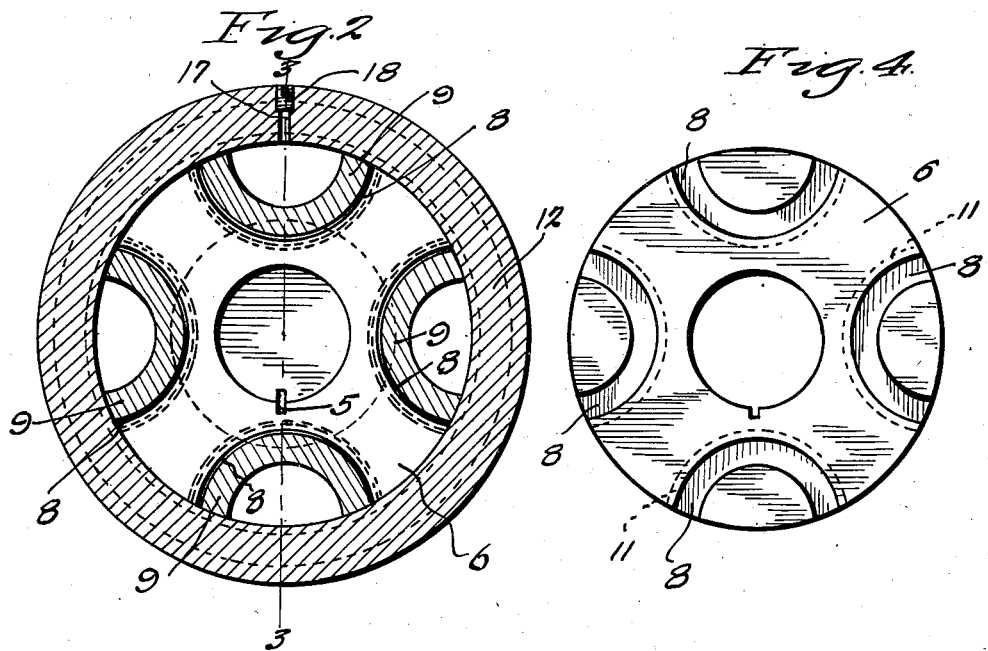
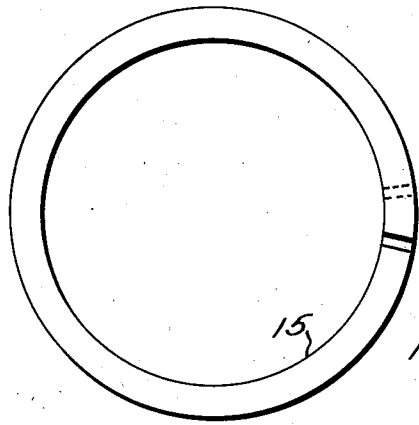
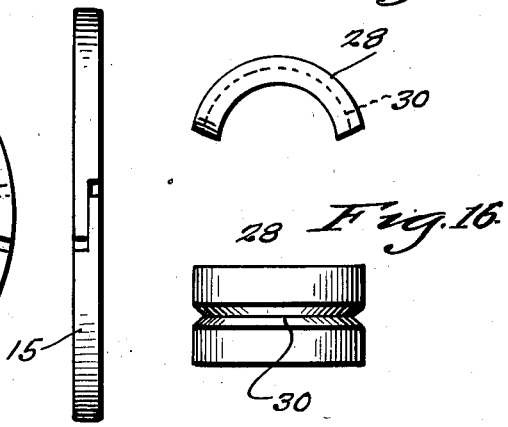
Inventor
Abner F. Knight
By Clarence A. O'Brien
Attorney April 7, 1942.  A. F. KNIGHT  2,278,997
SHAFT COUPLING
Filed Dec. 23, 1941  3 Sheets-Sheet 3
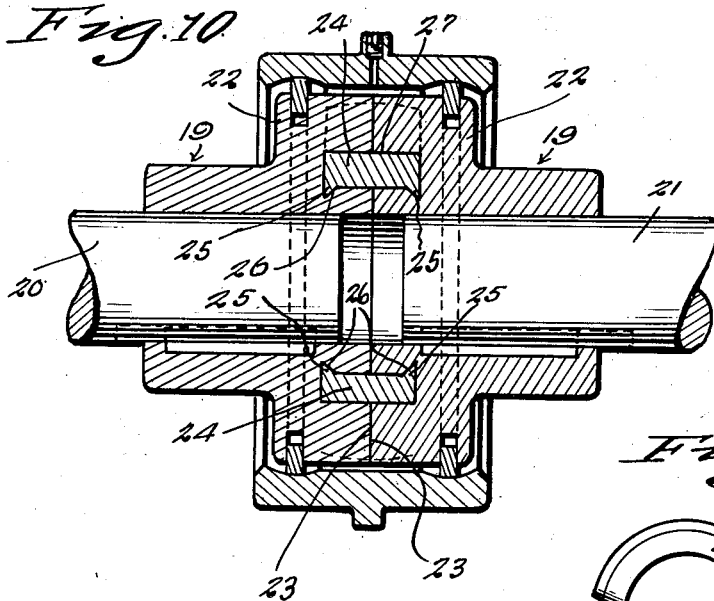
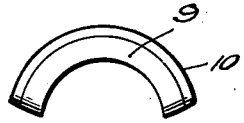
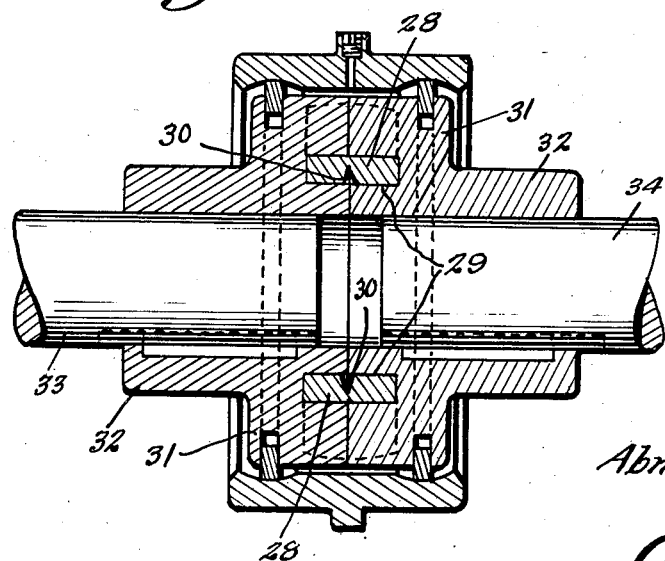
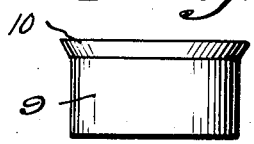
Inventor
Abner F. Knight
By Clarence A. O'Brien
Attorney Patented Apr. 7, 1942

2,278,997

UNITED STATES PATENT OFFICE 2,278,997

SHAFT COUPLING

Abner F. Knight, Fairfield, Ala.

Application December 23, 1941, Serial No. 424,187

6 Claims. (Cl. 64—6)

My invention relates to improvements in shaft couplings designed with the primary objects in view of providing a simply constructed, easily assembled and disassembled coupling in which bolts, nuts and pins are eliminated and which is adapted for self-lubrication when lubrication is desired.

Another object is to provide a coupling having the above advantages and which is flexible thereby adapting the same for connecting shafts end to end which are out of axial alignment relatively.

Still another object is to provide a simple form of coupling adapted to sheer under overload, as a safety provision.

Other and subordinate objects are also comprehended by my invention, all of which, together with the precise nature of my improvements, will be readily understood when the succeeding description and claims are read with reference to the drawings accompanying and forming part of this specification.

In said drawings:

Figure 1 is a view in side elevation of the preferred embodiment of my improved shaft coupling, Figure 2 is a view in vertical section taken on the line 2—2 of Figure 1, Figure 3 is a view in transverse section taken on the line 3—3 of Figure 2, Figure 4 is a view in front elevation of the flange of one of the coupling heads, Figure 5 is a view in side elevation of one of the sealing rings, Figure 6 is a view in edge elevation of said ring, Figure 7 is a view in side elevation of one of the keys for the preferred embodiment of the coupling, Figure 8 is a view in plan of said key, Figure 9 is a view in end elevation of said key, Figure 10 is a view in longitudinal section of a modified embodiment of the shaft coupling, Figure 11 is a view in side elevation of one of the keys for the modified embodiment of shaft coupling, Figure 12 is a view in plan of said key, Figure 13 is a view in end elevation of said key, Figure 14 is a view in longitudinal section of another modified embodiment of the shaft coupling, Figure 15 is a view in side elevation of one of the keys for the last-mentioned modified embodiment of the shaft coupling, Figure 16 is a view in plan of said key, and Figure 17 is a view in elevation of said key.

Referring to the drawings by numerals, and first to Figures 1 to 9, inclusive, according to the preferred embodiment of my invention, a pair of like shafts 1, 2 arranged end to end in slightly spaced apart relation, and either of which may be a driven shaft and the other a driving shaft, are equipped with a pair of coupling heads 3. The heads 3 comprise sleevelike hubs 4 in which the shafts 1, 2 are keyed, as at 5, said heads having enlarged concentric disc-like flanges 6. The flanges 6 have outer convex faces 7 opposed in slightly spaced apart relation.

In the outer face 7 of each flange 6 a plurality of semi-circular slots are provided, as at 8, said slots 8 being spaced equidistantly circumferentially of the flange 7 and opening at their ends onto the periphery of the flange. The slots 8 of one flange 6 are designed to mate with the slots 8 of the other flange to form opposed pairs of such slots.

Semi-circular, transversely flat, keys 9 coextensive in length with the length of the slots 8 are provided for sliding endwise into mating pairs of slots 8, respectively. The keys 9 are provided along one edge thereof, on one and the same sides of said keys, with a semi-circular external keeper rib 10 transversely beveled on the inner side thereof. The keeper ribs 10 are adapted to fit in correspondingly shaped keeper grooves 11 formed in the bottoms of the slots 8 of one flange 6.

Surrounding the flanges 6 is an annular, open-sided casing member 12 with a slight clearance between the same and the flanges 6. A pair of internal circumferential grooves 13 are provided in the casing member 12 adjacent opposite sides thereof. The grooves 13 are transversely arcuate. A pair of peripheral transversely square grooves 14 are provided in the flanges 6, respectively, and which are adapted to be centered relative to the grooves 13. A pair of split oil retaining rings 15 are fitted in the grooves 14 with the peripheries thereof seating in the grooves 13.

The casing member 12 is provided with an external, circumferential, reinforcing rib 16 in the center thereof and is bored, as at 17, to provide an oil inlet duct adapted to be closed by a screw plug 18.

It will be noted that the keys 9, see Figure 3, are slightly thinner than the depth of the slots 8 to provide a clearance between said keys and said slots.

As will now be seen, by virtue of the described arrangement and relation of the keys 9 in the slots 8, and the described arrangement of the oil retaining rings 15 in the slots 13 and 14, the heads 3 may tilt laterally in limited degree to compensate for rotation of the shafts 1, 2 when the latter are not exactly aligned, or under other conditions, such compensating movement being provided for by virtue of the clearance between the keys 9 and slots 8 and because of the fact that the edge portions of the keys 9 opposite to the ribbed edges are freely slidable laterally of the slots 8 in one of the flanges 6. It will furthermore be seen that the casing member 12, and oil retaining rings 15, together with the flanges 6, form an oil chamber into which oil may be introduced through the bore 17 to lubricate the keys 9 and slots 8. The oil retaining rings 15 being of the split type, said rings may be easily sprung inwardly of the grooves 14 to facilitate removal of the heads 3 from the casing member 12 and the replacement of said heads in said casing member as occasion may require.

In the modified embodiment of the shaft coupling, shown in Figures 10 to 13, inclusive, coupling heads 19, similar to heads 3, are provided for axially aligned shafts 20, 21, but the opposed outer sides of the flanges 22 of said heads 19 are straight as at 23, and engaged flat. The keys 24 are provided with internal ribs 25 on both side edges thereof, similar to ribs 10, and which seat in correspondingly shaped grooves 26 provided in the slots 27 of the flanges 22. Otherwise, the construction is the same as that previously described. The modified embodiment of the coupling just described provides a rigid shaft coupling, as will be clear.

In the modified embodiment of coupling shown in Figures 14 to 17, inclusive, the construction and arrangement is the same as that in the previously described modified embodiment with the exception that the ribs 25 on the keys 28 are eliminated, also the grooves 26 in the slots 29 for said keys, but said keys 28 are provided with internal circumferential V-shaped grooves, as at 30, for weakening the same in the plane of the engaging outer sides of the flanges 31 of the heads 32, so that under overload on either of the shafts 33, 34, said keys will sheer off and thereby disable the coupling, as a safety provision, the purpose of which will be understood.

The foregoing will, it is believed, suffice to impart a clear understanding of my invention without further explanation.

Manifestly, the invention is susceptible of modification in other respects than as herein set forth, and right is herein reserved to such other modifications as fall within the scope of the subjoined claims.

What I claim is:

1. In a draft coupling for connecting a pair of shafts in end-to-end relation, a pair of coupling heads fast on said ends of the shafts, respectively, and including a pair of concentric disc-like flanges opposed face to face, circumferentially spaced arcuate keyways in the opposed faces of said flanges opening at the ends thereof onto the peripheries of said flanges, the keyways in said flanges being arranged in opposed pairs, and arcuate keys slidably fitted in said pairs of keyways, respectively.

2. In a draft coupling for connecting a pair of shafts in end-to-end relation, a pair of coupling heads fast on said ends of the shafts, respectively, and including a pair of concentric disc-like flanges opposed face to face, circumferentially spaced arcuate keyways in the opposed faces of said flanges opening at the ends thereof onto the peripheries of said flanges, the keyways in said flanges being arranged in opposed pairs, arcuate keys slidably fitted in said pairs of keyways, respectively, an annular casing surrounding said flanges in spaced relation thereto and having a pair of internal circumferential grooves therein adjacent opposite edges thereof, respectively, said casing having an oil inlet therein, and a pair of oil retaining rings fitting in said grooves, respectively, and mortised into said flanges, respectively.

3. In a draft coupling for connecting a pair of shafts in end-to-end relation, a pair of coupling heads fast on said ends of the shafts, respectively, and including a pair of concentric disc-like flanges opposed face to face, circumferentially spaced arcuate keyways in the opposed faces of said flanges opening at the ends thereof onto the peripheries of said flanges, the keyways in said flanges being arranged in opposed pairs, and arcuate keys slidably fitted in said pairs of keyways, respectively, the opposed faces of said flanges being spaced apart and said keyways being wider than the thickness of said keys to provide clearances between the keyways and keys whereby said flanges are relatively tiltable laterally to render the coupling flexible.

4. In a draft coupling for connecting a pair of shafts in end-to-end relation, a pair of coupling heads fast on said ends of the shafts, respectively, and including a pair of concentric disc-like flanges opposed face to face, circumferentially spaced arcuate keyways in the opposed faces of said flanges opening at the ends thereof onto the peripheries of said flanges, the keyways in said flanges being arranged in opposed pairs, and arcuate keys slidably fitted in said pairs of keyways, respectively, said keys having an inner edge external arcuate rib, respectively, and said keyways having inner edge arcuate grooves for accommodating said ribs whereby said keys are locked in the keyways of one flange against removal sidewise therefrom.

5. In a shaft coupling for connecting a pair of shafts in end-to-end relation, a pair of coupling heads fast on said ends of the shafts, respectively, and including a pair of concentric disc-like flanges opposed face to face, circumferentially spaced arcuate keyways in the opposed faces of said flanges opening at the ends thereof onto the peripheries of said flanges, the keyways in said flanges being arranged in opposed pairs, and arcuate keys slidably fitted in said pairs of keyways, respectively, said keys having a pair of external arcuate edge ribs, and said keyways having inner edge arcuate grooves for accommodating said ribs whereby said flanges are locked together against separation laterally.

6. In a shaft coupling for connecting a pair of shafts in end-to-end relation, a pair of coupling heads fast on said ends of the shafts, respectively, and including a pair of concentric disc-like flanges opposed face to face, circumferentially spaced arcuate keyways in the opposed faces of said flanges opening at the ends thereof onto the peripheries of said flanges, the keyways in said flanges being arranged in opposed pairs, and arcuate keys slidably fitted in said pairs of keyways, respectively, and said keys having a central circumferential weakening groove therein, respectively, to provide for shearing of the keys under overload on either shaft.

ABNER F. KNIGHT.